United States Patent [19]

Cyphers et al.

[11] Patent Number: 5,318,314
[45] Date of Patent: Jun. 7, 1994

[54] PAINT HOPPER ASSEMBLY

[75] Inventors: Norman A. Cyphers, Rogers; Dwaine D. Straight, Mounds View; Larry M. Berens, Blaine, all of Minn.

[73] Assignee: Wagner Spray Tech Corporation, Minneapolis, Minn.

[21] Appl. No.: 953,488

[22] Filed: Sep. 29, 1992

[51] Int. Cl.$^5$ ............................ B62B 1/10; B05B 9/03
[52] U.S. Cl. ................................ 280/47.26; 280/79.2; 280/47.33; 239/146; 222/608; 141/231
[58] Field of Search ............... 280/47.26, 47.31, 79.2, 280/47.33, 47.34, 47.24, 79.5; 239/146, 148; 417/234; 141/231; 222/608

[56] References Cited

U.S. PATENT DOCUMENTS

| | | | |
|---|---|---|---|
| 1,544,356 | 6/1925 | Spaeth | 280/47.26 |
| 2,673,729 | 3/1954 | Murray | 280/47.34 |
| 3,752,494 | 8/1973 | Dunn | 280/47.26 |
| 4,440,410 | 4/1984 | Bradshaw | 280/47.26 |
| 5,217,238 | 6/1993 | Cyphers et al. | 280/47.34 X |

Primary Examiner—Margaret A. Focarino
Assistant Examiner—Peter English
Attorney, Agent, or Firm—Faegre & Benson

[57] ABSTRACT

A paint hopper assembly, capable of allowing a paint pump assembly with a suction tube located between two support legs to withdraw paint directly from the paint hopper assembly, has an elongated bin with a front portion capable of fitting between the support legs and a bottom surface which slopes toward the front portion, a hopper handle and a support including a plurality of wheels.

15 Claims, 3 Drawing Sheets

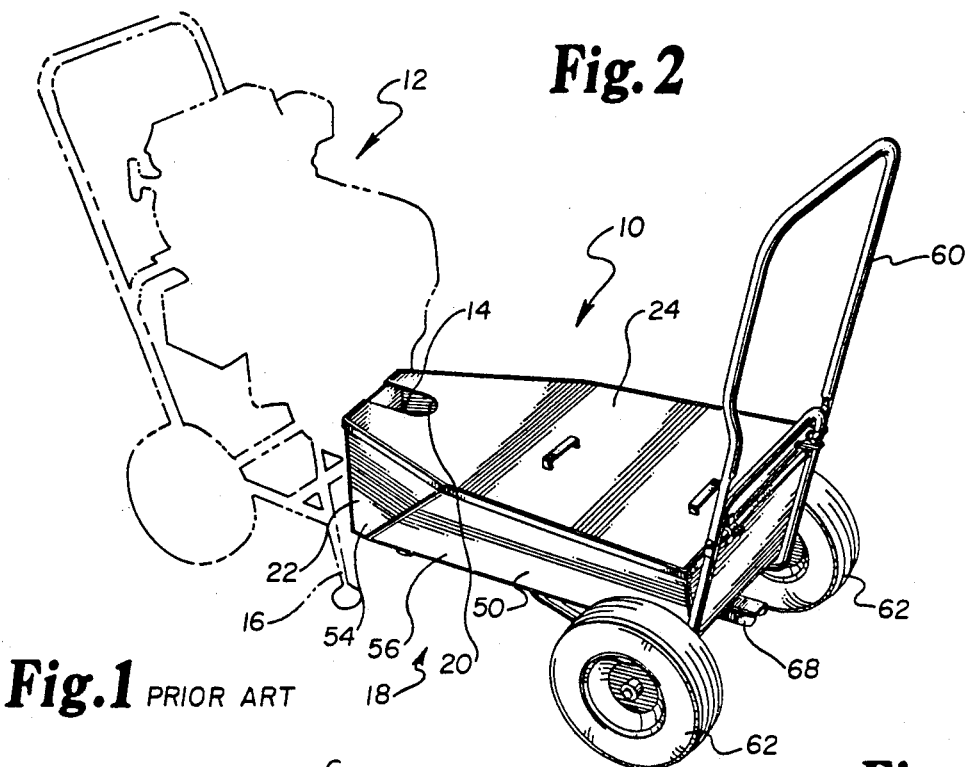
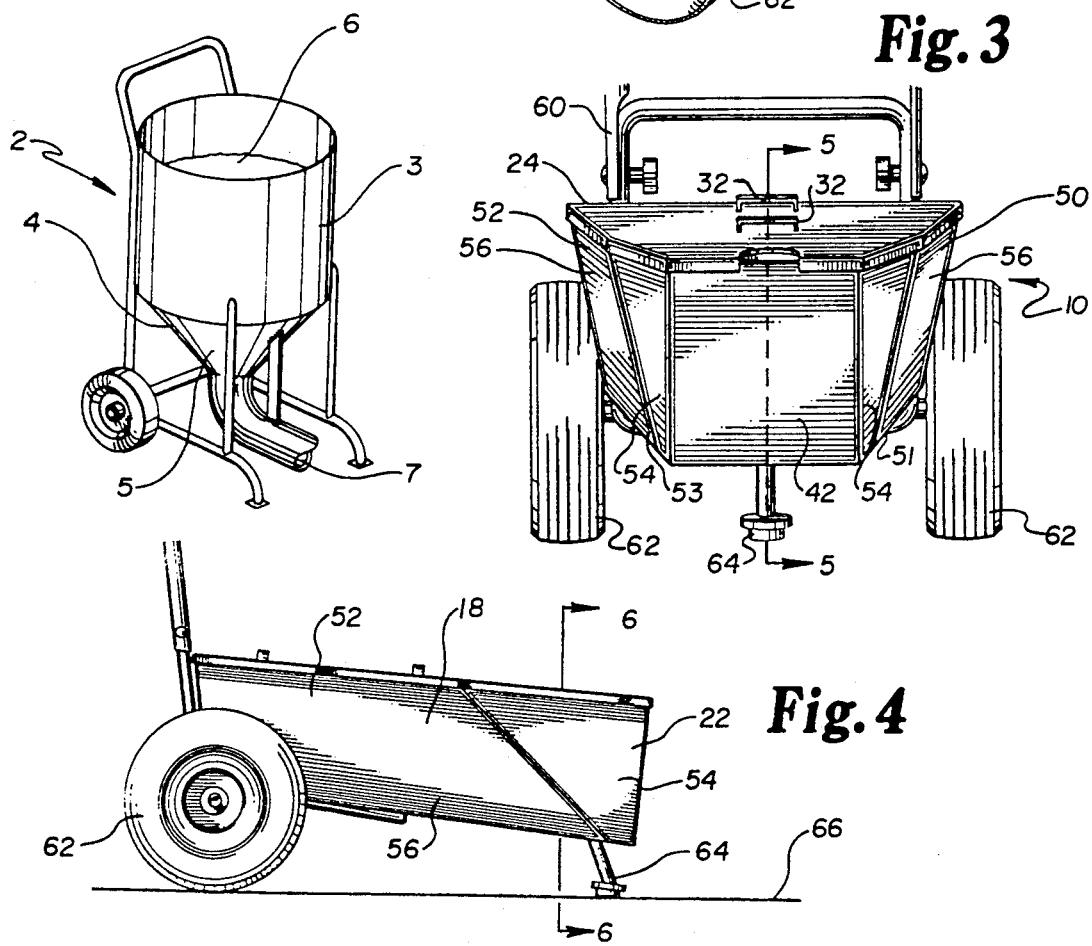

PAINT HOPPER ASSEMBLY

The present invention relates to a hopper assembly for paint. More particularly, the present invention is a hopper assembly designed be used with thick, viscous paints such as tile paint, a specialized paint which when sprayed on an object dries to a coat resembling stone.

Thick paints such as tile paint flow more slowly than traditional paint. Although these paints atomize less easily than traditional paints, it is possible to apply them with paint spraying equipment as long as some specialized components are used, such as special hoses and nozzles that compensate for the peculiar features of tile paint.

In addition to hoses and spray tips, traditional paint containers or hoppers, from which paint is pumped during the spraying processes, are unable to function adequately when used with tile paint. Containers for less thick paints tend to be of a bucket shape with a flat bottom, into which a suction tube from a paint pump assembly may be directly inserted. In this way the pump assembly is able to pull the paint directly from the paint container through an inlet in the suction tube and supply paint to a spray gun. Unfortunately, the suction tube of the pump assembly is typically located between two support legs which serve to support the pump and to help prevent the suction tube from any accidental damage which could be caused by striking an object during movement of the pump assembly. The paint container must fit between these legs if the suction tube is to withdraw paint directly from the container. To fit between the support legs, the bucket-shaped container typically has only a five-gallon capacity.

This limited capacity requires that the container be refilled frequently. With thinner paints, it is possible to simply pour additional paints into the five gallon container without removing the suction tube from the container. However, this is not possible with thicker paints such as tile paint, as thicker paints require a larger opening to avoid being poured onto the paint pump assembly. To refill a container with tile paint, it is necessary to stop applying thicker paints altogether and to remove the suction tube from the container before refilling. This requires additional effort, and can greatly slow down the painting process, especially where several spray guns are being fed by a single pump assembly having only a five-gallon container.

In addition, the thickness of tile paint often prevents it from flowing adequately to keep the inlet of the suction tube covered in a flat bottomed container. Thus, when the tile paint reaches a certain level, the paint is pumped from the paint container faster than the tile paint can re-cover the suction tube inlet. This causes the suction mechanism to pull air through the spray gun until the tile paint is able to cover the suction mechanism, much like sucking on a straw near the bottom of a thick milk-shake. Sucking air in this manner can cause the spray gun to spurt or can create cavitation which reduces the flow of paint through the pump assembly so as to be unusable. Thus, the effective capacity of the container is reduced, as the paint remaining in the container becomes unusable when the paint level drops to the point of air suction.

One solution to these problems has been to create a hopper 2 as shown in FIG. 1, having a cylindrical wall 3 on top of a funnel-shaped bottom 4. The sloped sides 5 of the funnel-shaped bottom 4 utilize gravity to urge paint 6 down a center hole (not shown). A suction hose 7 is then connected from the center hole to the suction tube of the paint pump assembly (not shown), allowing the pump assembly to pump paint through the suction hose 7. This type of funnel-shaped hopper 2 has numerous advantages over the simple five-gallon bucket containers. First, the funnel-shaped hopper 2 can be larger than five-gallons, since the use of the suction hose 7 means that the hopper 2 does not need to be straddled by the support legs of the pump assembly. Second, the funnel shaped hopper 2 may be refilled without disturbing the spray pump assembly or stopping the spraying process. Third, the paint 6 may be mixed easily in the hopper 2 without fear of disturbing the suction tube. Finally, it is possible to design a cover (not shown) for the funnel-shaped hopper 2 which can be used to help prevent the paint 6 in the hopper 2 from drying out.

On the other hand, the use of the suction hose 7 greatly reduces the efficiency of the paint pump assembly as a result of the additional drag or resistance encountered as the paint 6 is pumped through the suction hose 7. In fact, the output of the pump assembly can be increased by forty (40) percent or more simply by allowing the suction tube of the paint pump assembly to draw paint directly out of the hopper 2 rather than through the suction hose 7.

The current invention overcomes the problem in the prior art by providing a hopper which provides the advantages of the funnel-shaped hopper 2 while avoiding the loss of pump output efficiency caused by the suction hose 7.

BRIEF DESCRIPTION OF THE DRAWINGS

FIG. 1 is a perspective view of a prior art paint hopper.

FIG. 2 is a perspective view of the invention with phantom lines outlining a paint pump assembly to show preferred use of the invention.

FIG. 3 is a front elevational view of the invention shown in FIG. 2.

FIG. 4 is a side elevational view of the invention shown in FIG. 2.

DETAILED DESCRIPTION OF THE INVENTION

Figure 5:
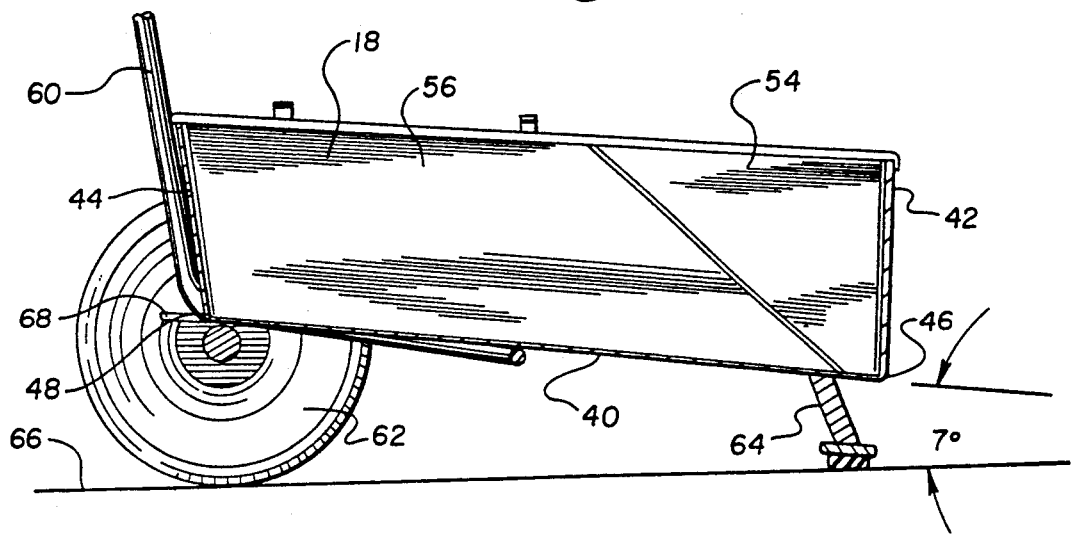
FIG. 5 is a sectional view of the invention shown in FIG. 3 taken along line 5—5.
Figure 6:
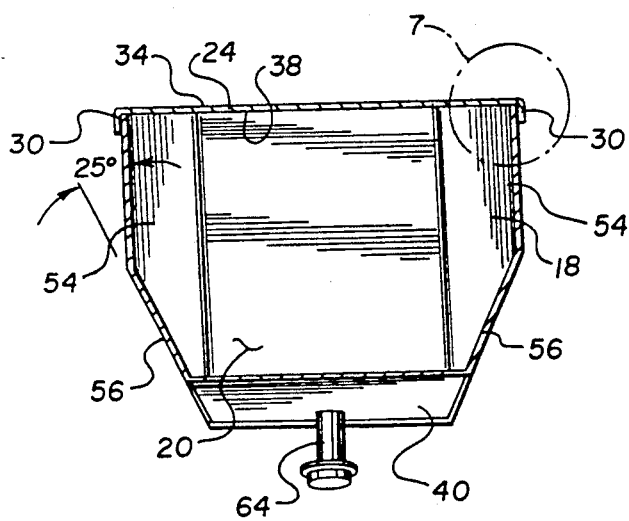
FIG. 6 is a sectional view of the invention shown in FIG. 4 taken along line 6—6.
Figure 7:
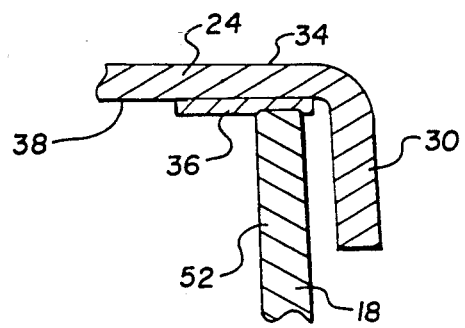
FIG. 7 is a enlarged view of portion 7 shown in FIG. 6.

Referring to FIG. 2, a paint hopper assembly 10 of the present invention is shown. Shown in phantom in FIG. 2 is a paint pump assembly 12, which illustrates the preferred use of paint hopper assembly 10. The paint pump assembly 12 has a suction tube 14 capable of withdrawing paint (not shown) directly from the hopper assembly 10. Two support legs 16 (only one of which is shown in FIG. 2) separated by a support width (not shown) support pump assembly 12 and help prevent damage to suction tube 14 by guarding against impact during movement of pump assembly 12.

The hopper assembly 10 has an elongated bin 18 that is longer from front to back than it is wide, the bin 18 having a bin interior 20 capable of holding paint. The bin 18 narrows at a front portion 22 to a frontal width narrow enough to allow the front portion 22 of bin 18 to fit between support legs 16. This allows suction tube 14 to be inserted into the front portion 22 of the elongated bin 18, so that paint can be pumped directly from bin 18.

Referring now to FIGS. 6, 7, 8 and 10, a lid 24 covers the interior 20 of bin 18 to help prevent paint in the interior 20 from drying out. A portion of lid 24 forms a notch-shaped opening 26 which allows the suction tube 14 to pass through the lid 24. Opening 26 extends through a front part 28 of the lid 24, thereby allowing the lid 24 to be positioned or removed without disturbing the paint pump assembly 12. Lid 24 also has a circumferential lip 30 which keeps the lid 24 in position on elongated bin 18. Lid handles 32 on a top surface 34 of the lid 24 make handling the lid 24 easier. In addition, a gasket 36 is attached to a lower surface 38 of lid 24 so as to form a partial, semi-permeable seal therebetween. In the preferred embodiment, the gasket 36 is formed of foam rubber.

Figure 8:
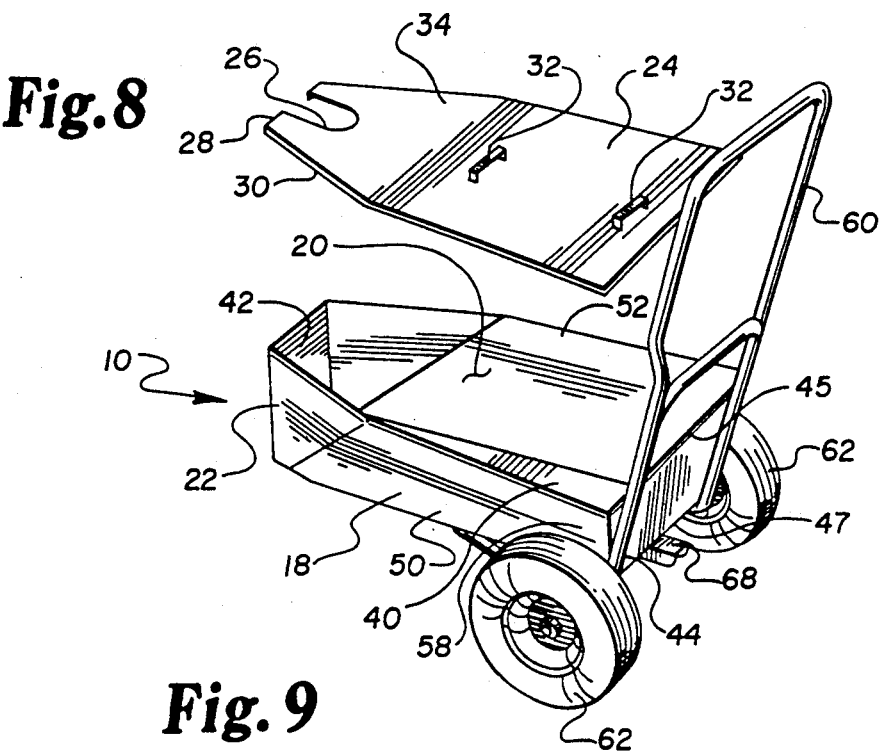
FIG. 8 is an exploded view of the invention shown in FIG. 2.
Figure 9:
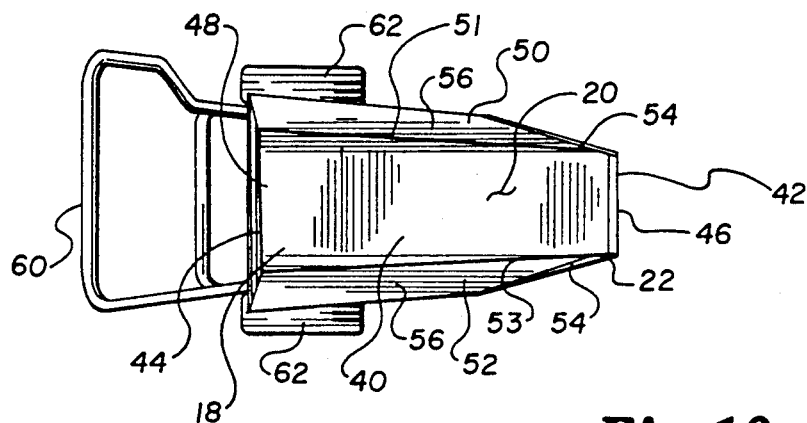
FIG. 9 is a top plan view of the invention shown in FIG. 2 with the lid removed to show the inside of the hopper.
Figure 10:
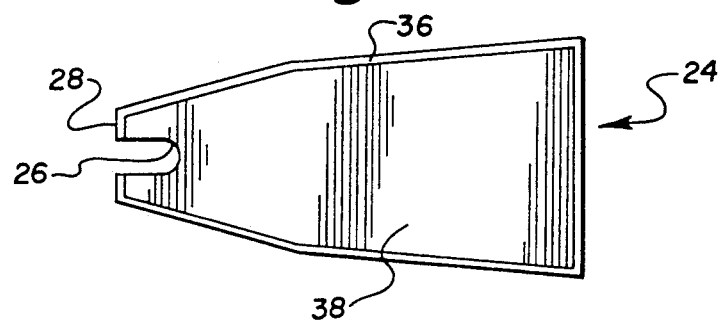
FIG. 10 is a bottom plan view of the lid to show gasket configuration.

As shown in FIGS. 3, 4, 5, 8 and 9, the elongated bin 18 of the preferred embodiment has a bottom surface 40 which narrows near the front portion 22 of the hopper assembly 10. A rectangular front wall 42 and a trapezoidal rear wall 44 extend generally upward from a front and rear edge 46, 48 of the bottom surface 40, respectively, with rear edge 48 being longer than front edge 46. The trapezoidal rear wall 44 is wider at its top 45 than at its bottom 47, as shown in FIG. 8. A left wall 50 and a right wall 52 extend upward from a left and right edge 51, 53, respectively, of the bottom surface 40. Left edge 51 and right edge 53 are of equal lengths, both being longer than either front edge 46 or rear edge 48. Walls 50, 52 extend from the front wall 42 to the rear wall 44 so as to complete the elongated bin 18. Left and right walls 50, 52 are each comprised of a first wall portion 54 and a second wall portion 56. The first wall portion 54 adjoins the front wall 42 and is generally vertical. The second wall portion 56 extends from the first wall portion 54 to the rear wall 44, and slants away from the interior 20 of the bin 18 approximately twenty-five (25) degrees from vertical.

In the preferred embodiment, each of the walls 42, 44, 50 and 52 and the bottom surface 40 are made of metal sections welded together. However, it is to be considered within the scope of this invention to construct the elongated bin 18 out of other materials or through other techniques, such as forming a plastic or fiberglass bin through traditional molding techniques.

Mounted on a rear portion 58 of the hopper assembly 10 is a hopper handle 60 and a pair of wheels 62, while mounted on the bottom surface 40 near the front portion 22 of the hopper assembly 10 is a hopper foot 64. As shown in FIGS. 4 and 5, the hopper assembly 10 is supported on a ground surface 66 by the pair of wheels 62 and the foot 64 so as to cause the bottom surface 40 to tilt approximately seven (7) degrees with respect to the ground surface 66 from the rear portion 58 to the front portion 22. Finally, a foot pedal 68 is attached to the bottom surface 40 near the rear portion 58 of the hopper assembly 10.

In use, the hopper assembly 10 is moved by rotating the hopper assembly 10 slightly about wheels 62 so as to cause foot 64 to come off the ground surface 66. Foot pedal 68 is pressed downward while hopper handle 60 is pulled to encourage this rotation. When the hopper assembly 10 is in a convenient location, the hopper assembly 10 is filled with paint, such as tile paint, with lid 24 removed. Since only the front portion 22 of hopper assembly 10 must fit between support legs 16, hopper assembly 10 may hold a much larger amount of paint than the five gallon bucket-shaped container of the prior art. Suction tube 14 of paint pump assembly 12 is inserted directly into the front portion 22 of hopper assembly 10. Lid 24 may then be placed over the interior 20 of hopper assembly 10 to prevent the paint from drying out.

As the paint is pumped from interior 20, the tilt in the bottom surface 40 causes gravity to urge paint toward the front portion 22 and hence toward suction tube 14. The slant in the left and right walls 50, 52 serves a similar purpose in urging paint toward the center of elongated bin 18 and toward suction tube 14. Urging the paint toward suction tube 14 serves to reduce the percentage of paint remaining in the bin 18 when the suction tube 14 begins sucking air and paint pump assembly 12 can no longer pump an adequate amount of paint. When it becomes necessary to refill the hopper assembly 10, the lid 24 can be removed and paint can be poured into and mixed in the rear portion 58 of the hopper assembly 10 without disturbing the pump assembly 12.

Thus, the benefits of the funnel-shaped hopper 2 are achieved with the additional advantage of pumping paint directly from the hopper assembly 10.

The invention is not to be taken as limited to all of the details thereof as modifications and variations thereof may be made without departing from the spirit or scope of the invention. For instance, the left wall 50 and the right wall 52 could each be comprised of only a single portion rather than the two wall portions 54, 56, or could be sloped at a variety of angles with respect to vertical.

What is claimed is:

1. A paint hopper assembly for supplying paint to a paint pump assembly having a suction tube located between two support legs separated by a support width, the paint hopper assembly comprising:

a) an elongated bin being longer from front to back than from side to side, and having walls and a bottom surface defining a bin interior capable of holding paint, the bin also having a front portion with a frontal width smaller than the support width, such that the front portion may fit between the support legs with the suction tube of the paint pump assembly positioned within the bin and wherein a portion of the walls of the elongated bin slope outward away from the bin interior;

b) a hopper handle attached to the bin;

c) a support means for supporting the bin having a plurality of wheels, such that the support means causes a rear portion of the bin to be higher than the front portion; and d) a lid that fits in place over the elongated bin, the lid having a notch-shaped opening which extends through a front part of the lid to allow the suction tube of the paint pump assembly to pull paint directly from the bin while the lid is in place, and to allow the lid to be installed and removed while the suction tube is positioned within the bin.

2. The paint hopper assembly of claim 1 wherein the support means further comprises a hopper foot located at the front portion of the bin.

3. The paint hopper assembly of claim 2 wherein the plurality of wheels of the support means further comprises two wheels located at the rear portion of the bin.

4. The paint hopper assembly of claim 1 wherein the walls of the elongated bin extend generally vertically from the bottom surface.

5. The paint hopper assembly of claim 1, wherein the lid further comprises a lid handle positioned on a top surface of the lid.

6. The paint hopper assembly of claim 1, wherein the bottom surface of the elongated bin comprises a generally flat surface having a left and a right edge of substantially equal lengths, and a front and a rear edge each being shorter than the length of either of the left and right edges.

7. The paint hopper assembly of claim 6 wherein the rear edge is longer than the front edge.

8. The paint hopper assembly of claim 7, wherein the walls comprise a front wall extending generally upward from the front edge, a right wall extending generally upward and outward from the right edge, a rear wall extending generally upward from the rear edge and a left wall extending generally upward and outward from the left edge.

9. The paint hopper assembly of claim 8, wherein the front, right, rear and left walls are all generally planar.

10. The paint hopper assembly of claim 8 wherein the left and right walls each comprise:
   i) a first generally planar wall portion connected to the front wall, extending generally vertically upward from the bottom surface; and
   ii) a second generally planar wall portion connected to the rear wall, extending upward from the bottom surface, and sloping outward away from the bin interior.

11. The paint hopper assembly of claim 10, wherein the the second generally planar wall portion slopes outward away from the bin interior approximately 25 degrees from vertical.

12. The paint hopper assembly of claim 11, wherein the front and rear walls comprise respectively a rectangle and a trapezoid, with a top of the rear wall being wider than a bottom of the rear wall.

13. A paint hopper assembly for supplying paint to a suction tube of a paint pump assembly, the paint hopper assembly comprising:
   a) an elongated bin defining a bin interior, the bin having
      i) a generally planar bottom surface with a front, a rear, a left and a right edge, the left and right edges having equal lengths, the rear edge being longer than the front edge, and the front and rear edges each being shorter than either of the left and right edges,
      ii) a generally planar trapezoidal rear wall extending generally upward from the rear edge of the bottom surface, the rear wall having a top wider than the rear edge of the bottom surface,
      iii) a generally planar front wall extending generally upward from the front edge of the bottom surface,
      iv) a left and a right wall each extending both upward from the left and right edges of the bottom surface, respectively, and outward away from the bin interior;
   b) a hopper handle attached to the bin;
   c) a support foot attached to the elongated bin for supporting a front portion of the bin;
   d) a plurality of wheels attached to the bin for supporting a rear portion of the bin, such that the rear portion of the bin is higher than the front portion of the bin; and
   e) a lid that fits in place over the elongated bin, the lid having a notch-shaped opening which extends through a front part of the lid to allow the suction tube of the paint pump assembly to pull paint directly from the bin while the lid is in place, and to allow the lid to be installed and removed while the suction tube is positioned within the bin.

14. The paint hopper assembly of claim 13 wherein the left and right walls each comprise:
   i) a first generally planar wall portion connected to the front wall, extending generally vertically upward from the bottom surface; and
   ii) a second generally planar wall portion connected to the rear wall, extending upward from the bottom surface, and sloping away from the bin interior approximately 25 degrees from vertical.

15. The paint hopper assembly of claim 14 wherein the bottom surface slopes approximately seven degrees from horizontal.

* * * * *